United States Patent
Orbon (10) Patent No.: US 10,577,095 B2
(45) Date of Patent: Mar. 3, 2020

(54) ACTIVE ROTOR DAMPING SYSTEM

(71) Applicant: Sikorsky Aircraft Corporation, Stratford, CT (US)

(72) Inventor: James Orbon, New Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 216 days.

(21) Appl. No.: 15/545,844

(22) PCT Filed: Jan. 26, 2016

(86) PCT No.: PCT/US2016/014832
§ 371 (c)(1),
(2) Date: Jul. 24, 2017

(87) PCT Pub. No.: WO2016/123055
PCT Pub. Date: Aug. 4, 2016

(65) Prior Publication Data
US 2018/0022448 A1 Jan. 25, 2018

Related U.S. Application Data

(60) Provisional application No. 62/108,238, filed on Jan. 27, 2015.

(51) Int. Cl.
*B64C 27/68* (2006.01)
*B64C 27/48* (2006.01)
(Continued)

(52) U.S. Cl.
CPC .............. *B64C 27/48* (2013.01); *B64C 27/00* (2013.01); *B64C 27/001* (2013.01);
(Continued)

(58) Field of Classification Search
CPC ....... B64C 27/48; B64C 27/00; B64C 27/001; B64C 27/635; B64C 27/68;
(Continued)

(56) References Cited

U.S. PATENT DOCUMENTS 2,774,553 A * 12/1956 Jensen ................... B64C 27/51
244/17.17
2,960,168 A * 11/1960 Emmerson .............. B64C 27/54
244/17.13

(Continued)

OTHER PUBLICATIONS

International Search Report and Written Opinion; International Application No. PCT/US2016/014832; International Filing Date: Jan. 26, 2016; dated May 6, 2016; 13 Pages.

*Primary Examiner* — Woody A Lee, Jr.
*Assistant Examiner* — Brian Christopher Delrue
(74) *Attorney, Agent, or Firm* — Cantor Colburn LLP (57) ABSTRACT

An aircraft is provided and includes a non-rotating frame, an engine disposed in the non-rotating frame, a rotating frame, which is drivable by the engine to rotate relative to the non-rotating frame to generate lift and thrust, the rotating frame including a hub and rotor blades extending outwardly from the hub, an actuation system including electro-mechanical actuators (EMAs) respectively disposed in the rotating frame between the hub and the rotor blades, each EMA including a rotary inductive device, a gear train associated with each EMA and the corresponding rotary inductive device to convert linear displacements of a piston responsive to rotor blade lead/lag into rotation of the rotary inductive device and a controller that controls the rotary inductive device to operate, in a first mode, as a motor which drives the gear train, and, in a second mode, as a generator which is driven by the gear train.

17 Claims, 5 Drawing Sheets

(51) Int. Cl.
*B64C 27/00* (2006.01)
*B64C 27/635* (2006.01)
*B64C 27/72* (2006.01)

(52) U.S. Cl.
CPC ............ *B64C 27/635* (2013.01); *B64C 27/68* (2013.01); *B64C 2027/004* (2013.01); *B64C 2027/7216* (2013.01); *Y02T 50/34* (2013.01)

(58) Field of Classification Search
CPC ...... B64C 2027/004; B64C 2027/7216; B64C 27/51; B64C 27/54; B64C 27/57; Y02T 50/34; B60G 13/00

USPC ............................ 416/105; 366/100; 188/267
See application file for complete search history.

(56) References Cited

U.S. PATENT DOCUMENTS

| | | | | |
|---|---|---|---|---|
| 5,775,469 | A * | 7/1998 | Kang | F16F 15/03 188/162 |
| 5,913,659 | A * | 6/1999 | Doolin | B64C 27/008 267/141.4 |
| 7,197,955 | B2 * | 4/2007 | Sharma | F16H 63/304 310/75 R |
| 8,038,394 | B2 * | 10/2011 | Stille | B64C 27/51 416/1 |
| 8,235,324 | B1 * | 8/2012 | Birch | B64C 27/68 244/17.25 |
| 8,256,313 | B2 * | 9/2012 | Ganter | F16H 25/20 74/335 |
| 8,941,251 | B2 * | 1/2015 | Zuo | B60G 17/06 290/1 R |
| 9,512,886 | B1 * | 12/2016 | Gilmore | F16D 23/12 |
| 2013/0189098 | A1 * | 7/2013 | Covington | B64C 27/51 416/1 |
| 2016/0069439 | A1 * | 3/2016 | Davies | F16H 1/28 74/89.39 |

* cited by examiner

ACTIVE ROTOR DAMPING SYSTEM

CROSS REFERENCE TO RELATED APPLICATIONS

This application is a National Stage application of PCT/US2016/014832, filed Jan. 26, 2016, which claims the benefit of U.S. Provisional Application No. 62/108,238, filed Jan. 27, 2015, both of which are incorporated by reference in their entirety herein.

BACKGROUND OF THE INVENTION

The subject matter disclosed herein relates to an active rotor damping system and, more particularly, to an active lead-lag damping system for articulated rotor systems.

Rotary-wing aircraft include rotor systems and rotor blade assemblies to generate lift and allow for controlled operation of the air-vehicle.

During rotorcraft operation, the rotor blades are influenced by aerodynamic and inertial forces. As a result, each blade will experience elastic deformation as well as rigid body motion as a consequence of the forces acting upon it, referred to herein as blade dynamics. As a result of the blade dynamics, rotor systems are typically susceptible to forms of aero-elastic and aero-mechanical instabilities.

One form of instability is ground resonance, which is a cumulative, system-level effect of the individual blade dynamics. The motion of the blades about their respective lead/lag axis couples with the natural frequency of the landing gear and fuselage. In this mode, there is a migration of the rotor system center of gravity away from the axis of rotation. If this migration continues in an increasing and divergent manner, the system is deemed to be "unstable." Another form of instability includes air-resonance, where the cyclic motion in the rotor system couples with a structural natural frequency of the fuselage in forward flight and introduces undesirable vibration inputs to the airframe. Instability can have a significant, adverse impact on the operation of the air-vehicle, including the damage to rotor system and potentially loss of the air-vehicle.

Stability is heavily influenced by damping; where damping is a force that acts upon an object that acts in the opposing direction of motion and is proportional to the velocity of the object. In the context of a helicopter blade, the profile of the blade is capable of producing aerodynamic damping. However, in the direction of rotation, also referred to as the edgewise direction, the blade has a very limited profile. This reduced profile is advantageous from an aerodynamic perspective as it minimizes drag induced aerodynamic forces. But conversely, it severely degrades the aerodynamic damping potential in this plane of motion.

Thus, a typical feature of an articulated rotor system is the lead/lag damper, which is usually mounted between the hub and the rotor blade within the lead-lag reference-plane. These devices serve to augment the aerodynamic and structural damping of the rotor blade in the lead/lag direction. As the blade lag-motion (and corresponding velocity) increases, the dampers produce an increasing resistive force in order to minimize cyclic forces generated within the rotor system and ensure avoidance with the other inherent natural frequencies of the air-vehicle so as to ensure stability of the rotor system. Typically, the lead/lag dampers are sized for a variety of considerations including the need to stabilize ground resonance of the rotary-wing aircraft.

Although effective, current dampers make use of hydraulic restriction as the primary damping mechanism. They operate under high pressures and may require relatively comprehensive maintenance attention. Furthermore, as typical lead/lag damper technology is passive, the dampers subject the rotor systems to loading during conditions in which the additional force produced by the damper is not required in order to maintain rotor system stability. Thus, the overall structural envelope and weight of the rotor systems such that aircraft weight is concomitantly increased.

BRIEF DESCRIPTION OF THE INVENTION

According to one aspect of the invention, an aircraft is provided and includes a non-rotating frame, an engine disposed in the non-rotating frame, a rotating frame, which is drivable by the engine to rotate relative to the non-rotating frame to generate lift and thrust, the rotating frame including a hub and rotor blades extending outwardly from the hub, an actuation system including electro-mechanical actuators (EMAs) respectively disposed in the rotating frame between the hub and the rotor blades, each EMA including a rotary inductive device, a gear train associated with each EMA and the corresponding rotary inductive device to convert linear displacements of a piston responsive to rotor blade lead/lag into rotation of the rotary inductive device and a controller that controls the rotary inductive device to operate, in a first mode, as a motor which drives the gear train, and, in a second mode, as a generator which is driven by the gear train.

In accordance with additional or alternative embodiments, the non-rotating frame includes a slip-ring assembly by which electrical power and signals are transmittable between the non-rotating and rotating frames.

In accordance with additional or alternative embodiments, the controller adjusts the EMAs in the second mode to apply variable damping to affect the rotor blade lead-lag.

In accordance with additional or alternative embodiments, the actuation system further includes feedback by which the controller controls the rotary inductive device of each EMA in the first or second mode.

In accordance with additional or alternative embodiments, each EMA further includes a linear actuator.

In accordance with additional or alternative embodiments, the rotary inductive device includes stationary stator windings and a rotor.

In accordance with additional or alternative embodiments, the stationary stator-windings include insulated, inductive coils wound in a three phase configuration about an axis of rotation of the rotor.

In accordance with additional or alternative embodiments, each EMA includes a gear-train to convert the linear displacement of the piston to rotation with a gear reduction.

According to another aspect, a rotor system of an aircraft, which is drivable to rotate to thereby generate lift and thrust for the aircraft, is provided and includes a hub, rotor blades extending outwardly from the hub, an actuation system including electro-mechanical actuators (EMAs) respectively disposed between the hub and each of the rotor blades, each EMA including a rotary inductive device, a gear train associated with each EMA and the corresponding rotary inductive device to convert linear displacements of a piston responsive to rotor blade lead/lag into rotation of the rotary inductive device and a controller that controls the rotary inductive device to operate, in a first mode, as a motor which drives the gear train, and, in a second mode, as a generator which is driven by the gear train.

In accordance with additional or alternative embodiments, the controller adjusts the EMAs in the first mode to apply variable damping to affect the rotor blade lead-lag.

In accordance with additional or alternative embodiments, the actuation system further includes feedback by which the controller controls the rotary inductive device of each EMA in the first or second mode.

In accordance with additional or alternative embodiments, each EMA further includes a linear actuator.

In accordance with additional or alternative embodiments, the rotary inductive device includes stationary stator windings and a rotor.

In accordance with additional or alternative embodiments, the stationary stator-windings include insulated, inductive coils wound in a three phase configuration about an axis of rotation of the rotor.

In accordance with additional or alternative embodiments, each EMA includes a gear-train to convert linear motion to rotation with gear reductions.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

It has been found that performance of current passive, linear-hydraulic dampers is limited in certain circumstances. Current dampers are designed to provide high damping capabilities at a fixed frequency by virtue of internal hydraulic valves. In particular, a main rotor damper provides resistive damping forces at the regressive or progressive lag modes (hereinafter referred to as "lag modes"). Providing large forces at these lag modes is used to ensure stability of a main rotor system.

However, during aircraft operation, the dynamics of the main rotor blade about the lead/axis varies and current passive dampers, which are designed to operate most efficiently in pre-determined states, do not always operate in their optimum state. This can subject the associated aircraft to degraded performance modes. In addition, current damper performance is generally nonlinear in that dampers provide diminishing force output at increasingly higher velocities. In forward flight, the main rotor blade dynamics are such that each blade will typically experience significant excursions within the lead lag plane. The frequency of this occurrence generally occurs once per revolution, referred to herein as 1/rev. Hydraulic dampers provide a force output due to any imparted velocity of the piston. This results in large coupled once per revolution (1/rev) force amplitudes when the aircraft is operating in forward flight. However, the lag modes of the aircraft typically occur at frequencies lower than 1/rev. Stability is only impacted by damping forces acting at the lag mode frequency of interest. Thus, forces generated by the main rotor damper at the 1/rev frequency, or other frequencies not related to the lag modes, may not promote stability of the rotor system and may subject the aircraft to excessive and unwanted loading and vibration. Current linear-hydraulic dampers may also be disproportionately high drivers of direct maintenance costs due to the frequent need to inspect service and overhaul the hydraulic seals within current devices.

In any case, active rotor systems require power and communication signals to be provided by way of a slip-ring and a failure of the slip-ring can result in loss of functionality of components within the rotating frame.

As will be described below, a novel active lead-lag damping system for fully articulated or semi-rigid rotor systems is provided. The system includes an electro-mechanical linear actuator mounted between a hub and a rotor blade about a lead-lag reference-plane. The system also incorporates an integrated electrical controller and energy storage system (hereinafter referred to as "an electrical system"), which accommodates both linear force output and regenerative energy capture. The electrical system will include a controller and integrated microprocessor with the ability to accept and run custom developed advanced control algorithms. With these components, lead-lag forces will be capable of back driving the actuator piston and inducing electrical flux into the stator coils acting as an inductive, alternating-current electrical generator. This energy could then be converted into electrical power and either re-conditioned to be supplied back to the EMA's stator coils as a form of active power or stored via an energy storage element, such as a battery pack, capacitors or fly wheels mounted on the hub. Conversely, the actuator may be capable of providing force and position output to ensure the requisite blade damping and stability is maintained. The active nature of this system allows for significant gains in damping performance through optimized closed loop control algorithms. This will in turn allow for the helicopter to intelligently determine the stability state of the rotor system and provide the minimum amount of damping required. This has the effect of significantly decreasing load and vibration inputs to the aircraft as well as ensuring more positive control of rotor stability. Other advantages include the elimination of rotor mounted hydraulics, eliminating a significant maintenance and cost driver to the operation of the vehicle as well as the potential self-sufficiency of the system within the rotating control system and the ability to distribute power to other components within the rotor head.

Figure 1:
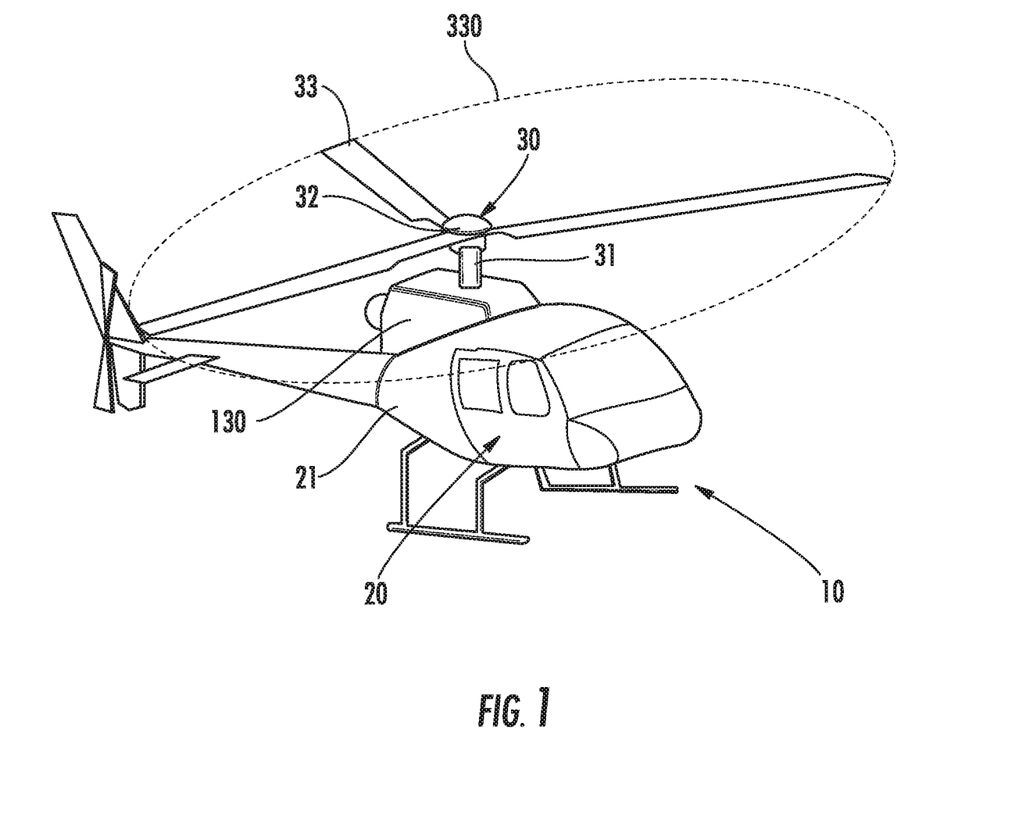
FIG. 1 is a perspective view of an aircraft in accordance with embodiments.

With reference to FIG. 1, an aircraft 10 is provided and includes a non-rotating frame 20, at least one rotor system or rotating frame 30 and a stationary dynamic system. The non-rotating frame 20 includes an airframe 21 that can be configured for manned or unmanned flight operations. In the former case, the airframe 21 is formed to define a cabin that is sized to accommodate a pilot and, in some cases, one or more crewmen and/or passengers along with flight control elements that can be used to control the aircraft 10 in flight. The rotating frame 30 is characterized in that it include features that are rotatable relative to the non-rotating frame 20 to generate lift and thrust for the aircraft 10. For example, the rotating frame 30 may include a rotor shaft 31, which is drivable to rotate about an axis of rotation defined along a longitudinal axis thereof, a hub 32 disposed along the rotor shaft 31 such that the axis of rotation extends through the hub 32 and rotor blades 33. The rotor blades 33 extend radially outwardly from the hub 32 and the hub 32 and the rotor blades 33 rotate with the rotor shaft 31 about the axis of rotation such that the rotor blades 33 define a rotor disk 330. The stationary dynamic system includes rotor and transmission components with bearings that accommodate rotation of the rotating frame 30 with respect to the non-rotating frame 20. While shown in the context of an aircraft 10 using a single set of rotor blades, it is understood that aspects could be used in other types of aircraft, including coaxial aircraft and fixed wing aircraft as well as ground based system such as wind turbines.

Figure 2:
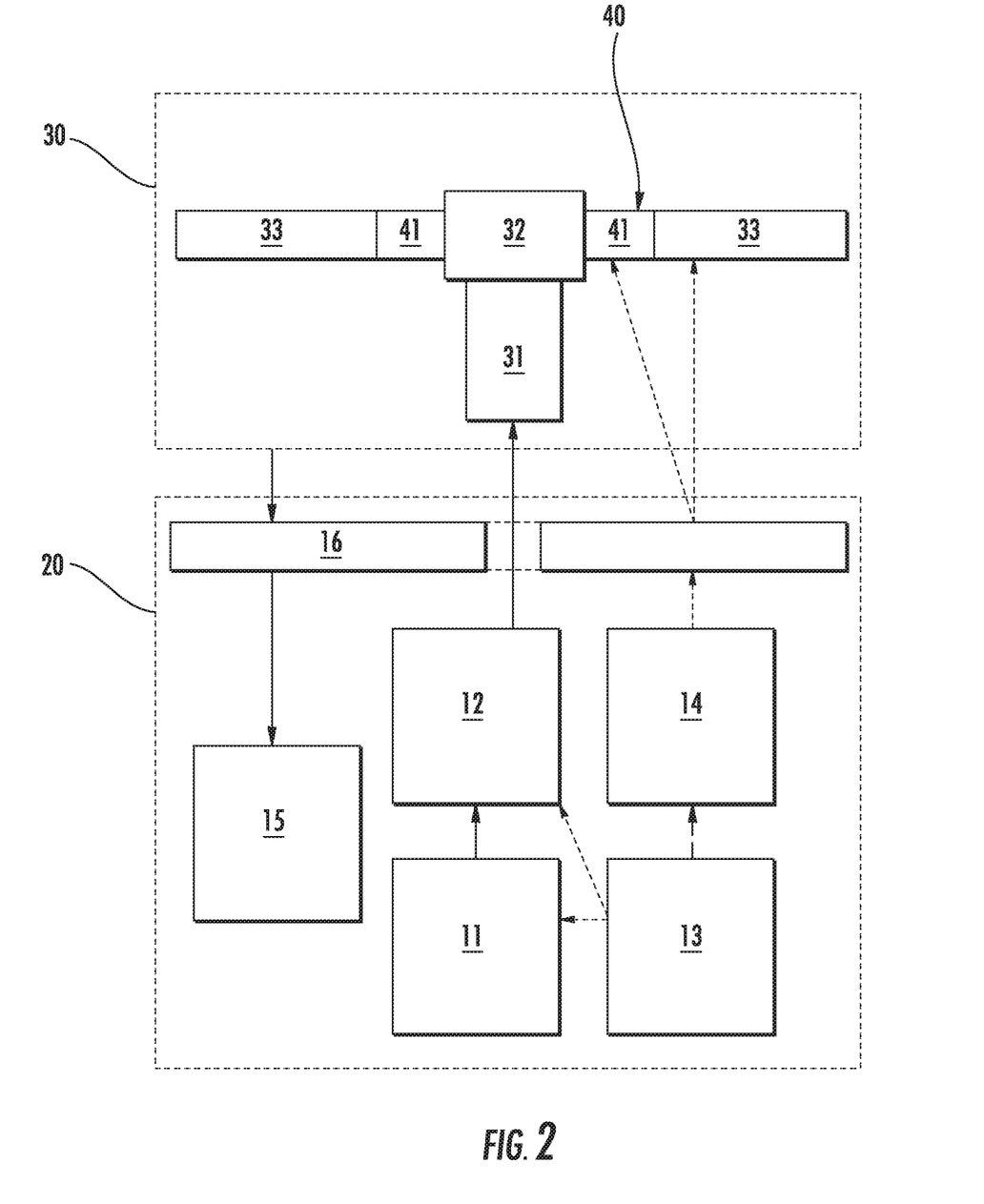
FIG. 2 is a schematic illustration of components of the aircraft of FIG. 1.

With reference to FIG. 2, the non-rotating frame 20 of the aircraft 10 further includes an engine 11, a transmission system 12 and a flight computer 13. The engine 11 is configured to generate power that can be used to drive the rotation of the rotating frame 30 and the transmission system 12 is disposed to transmit this power from the engine 11 to the rotor shaft 31 of the rotating frame 30. The flight computer is operably coupled to the engine 11, the transmission system 12, gearbox mounted flight control actuators (i.e., rotor servos) 130 (see FIG. 1) and the rotor blades 33 to control various operations of each in accordance with current flight conditions and pilot commands. The non-rotating frame 20 further includes an aircraft-electrical system 14 by which signals output from the flight computer 13 are issued to the rotating frame 30, various electrical systems 15 (e.g., an aircraft air-conditioning system) and a slip-ring assembly 16 by which electrical power and signals are transmittable between the non-rotating frame 20 and the rotating frame 30 to power components on the rotor blades 33, such as blade tip lights, heater mats and actuators.

The gearbox mounted flight control actuators 130 dictate blade pitch. The commands to the primary flight control actuators are provided by the flight control computer 13. These commands may be cyclic or collective pitch commands and serve to govern a magnitude and direction of thrust that can be generated by the rotating frame 30.

With reference to FIGS. 1-4, when the rotating frame 30 is driven to rotate about the axis of rotation, the rotor blades 33 may lead or lag the hub 32 during various flight conditions. A lead event occurs when a given rotor blade 33 leads rotation of the hub 32 in the direction of the rotation of the rotating frame 30 in a plane of the rotor disk 330 (i.e., the lead event occurs in-plane of a lead-lag reference plane within the rotor disk). Conversely, a lag event occurs when the given rotor blade 33 lags behind the rotation of the hub 32 in a direction opposite the direction of the rotation of the rotating frame 30 in the plane of the rotor disk 330 (i.e., the lag event also occurs in-plane of the lead-lag reference plane within the rotor disk). The lead or lag events (hereinafter referred to as "lead-lag events"), can be caused by aerodynamic interactions between the rotor blades 33 and surrounding air as well as inertial forces acting on the rotor blades 33 (i.e., the main rotor blades) due to cyclic commands and by the collective pitch commands.

With reference to FIGS. 1-4, the rotating frame 30 further includes an actuation system 40 as part of an active rotor damping system. The actuation system 40 includes a plurality of electro-mechanical actuators (EMAs) 41 that are respectively disposed in the rotating frame 30 between the hub 32 and corresponding ones of the rotor blades 33. That is, a single EMA 41 may be disposed between the hub 32 and the corresponding one of the rotor blades 33. The actuation system 40 is operable in an active damping-on-demand mode and a generator mode. In the active damping-on-demand mode, a controller (which will be described below) is capable of determining a stability state of the rotor system and minimizing the requisite control inputs to the EMAs 41 to keep the rotor system stable. This serves to alleviate loading experienced within the rotor blades 33 and the hub 32. In the generator mode, the EMAs 41 are back-driven by lead-lag events of the rotor blades 33 and electrical power provided to the stator coils of the EMAs 41 is controlled in such a manner so as to maximize power generation that is storable in the rotating frame 30 as will be described in greater detail below.

Figure 3:
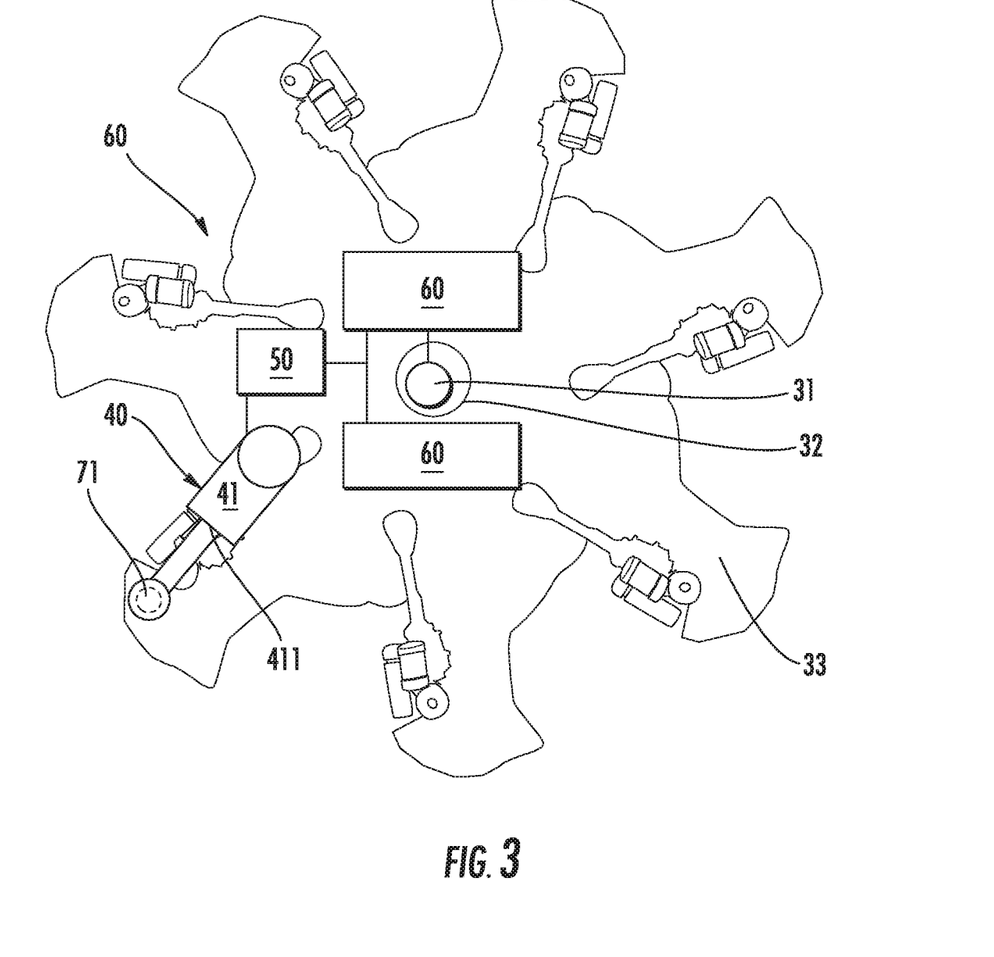
FIG. 3 is a schematic plan view of a rotor or actuation system of the aircraft of FIG. 1 in accordance with embodiments.
Figure 4:
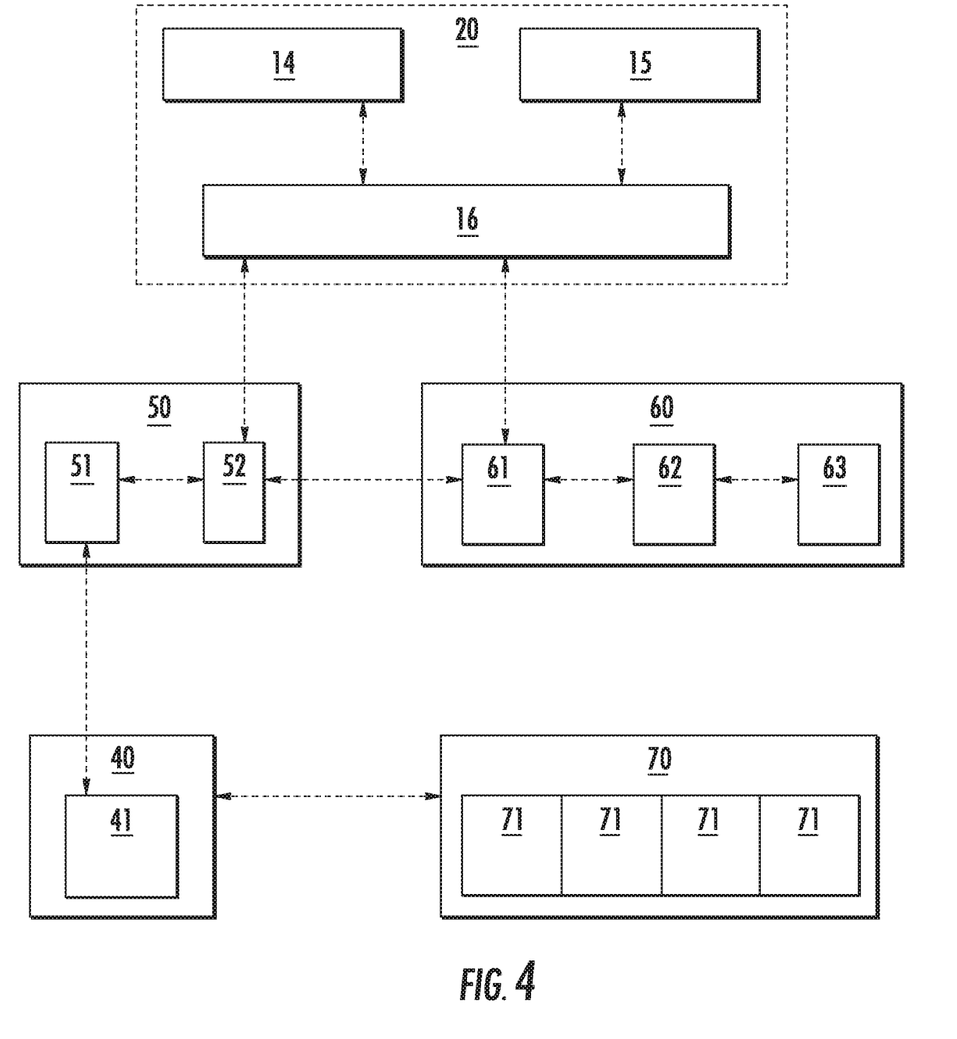
FIG. 4 is a schematic diagram of various components of the actuation system of FIG. 3 in accordance with embodiments.

In other words, in the active damping-on-demand mode, the EMAs 41 are controllable to affect and, in some cases, reduce or mitigate the lead-lag events of the corresponding rotor blades 33. That is, in an event that a given rotor blade 33 is in a leading condition, the corresponding EMA 41 will exert a force upon the rotor blade 33 in the lag direction and in-plane of the lead-lag reference plane to thereby counteract the leading condition and to correct the orientation of the rotor blade 33. Conversely, in an event that the rotor blade 33 is in a lagging condition, the corresponding EMA 41 will exert a force upon the rotor blade 33 in the lead direction and in-plane of the lead-lag reference plane to thereby counteract the lagging condition and to correct the orientation of the rotor blade 33.

As shown in FIGS. 3 and 4, the actuation system 40 includes a controller element 50, an energy storage system 60 and a feedback control system 70. The controller element 50 includes a processing unit 51 with associated electronic components and a memory unit 52. The processing unit 51 is disposed in signal communication with various elements of the non-rotating frame 20 via the slip-ring assembly 16, although it is understood that aspects could include wireless communications in addition to wired communications. The memory unit 52 has executable instructions and logic stored thereon, which, when executed, cause the processing unit 51 to control the EMAs 41 to operate in the active damping-on-demand mode and the generator mode. In addition, the cyclic and collective pitch commands may be transmitted to the controller element 50 whereby the executable instructions and logic stored on the memory unit 52 may be executed to cause the processing unit 51 to control the EMAs 41 to affect the output of the EMAs 41 and their corresponding influences on damping forces.

The energy storage system 60 is configured to store the energy generated by the EMAs 41 in the rotating frame 30 when the EMAs 41 operate in the generator mode. The energy storage system 60 includes power control electronics and high power distribution elements 61, an energy storage element 62 and a thermal management system 63. The power control electronics and high power distribution elements 61 are disposed in signal communication with various elements of the non-rotating frame 20 via the slip-ring assembly 16 and with the processing unit 51. The energy storage element 62 can be provided as a capacitor, a fly wheel, any type of chargeable and rechargeable battery pack or combinations thereof. The thermal management system 63 is configured to maintain a temperature of the energy storage element 62 within a predefined range, although it is understood that the thermal management system 63 need not be used in all aspects.

The feedback control system 70 includes a plurality of sensors 71 of various types arrayed about the rotating frame 30. The sensors 71 perform multiple sensing operations including, but not limited to, identifying when lead-lag events occur as well as identifying a lead-lag magnitude of those lead-lag events. In addition, the sensors 71 sense an amount of lead-lag that is corrected by the EMAs 41 and issue to the controller element 50 a signal reflective of the correction. The controller element 50 then analyses the data of the signal using feedback loop control logic to determine if the EMAs 41 need to be driven in forward or reverse directions. Thus, the controller element 50 controls inputs to the EMAs 41 in at least the active damping-on-demand mode by way of the sensors 71 of the feedback control system 70. Moreover, in the active damping-on-demand mode, the controller element 50 may use feedback from each EMA 41 in conjunction with a control algorithm to determine a stability state of the rotating frame 30. The controller element 50 is then capable of minimizing electrical power supplied to each EMA 41, as appropriate, so as to alleviate the loads imposed on the rotor blades 33 and the hub 32 in scenarios where significant damping forces are not required.

Figure 5:
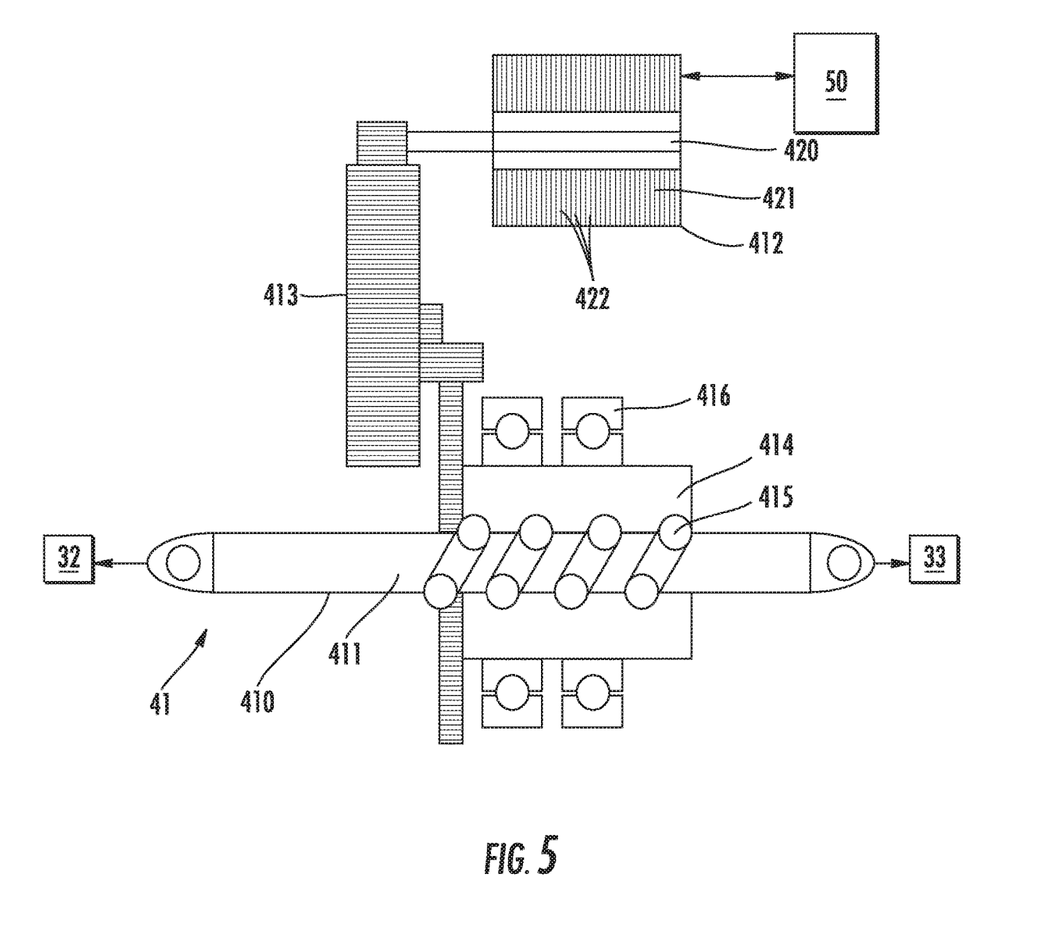
FIG. 5 is a schematic diagram of an electro-mechanical actuator of the actuation system of FIGS. 3 and 4 in accordance with embodiments.

With reference to FIG. 5, each EMA 41 may include a linear actuator 410. More particularly, each EMA 41 may include a piston 411, a rotary inductive device 412 and a gear train 413. The piston 411 is anchored at a first end thereof to the hub 32 and coupled at a second end thereof to the corresponding rotor blade 33 (see FIG. 3) or vice versa depending on the particular configuration of the corresponding aircraft. The rotary inductive device 412 is coupled to the controller element 50 is may be operated by the controller element 50 as a motor is a first operational mode or as a generator in a second operational mode. When the rotary inductive device 412 operates as the motor, the rotary inductive device 412 is disposed to drive movements of the piston 411 relative to the hub 32 to thereby affect (i.e., reduce or mitigate) the lead-lag events of the rotor blades 33. Conversely, when the rotary inductive device 412 operates as a generator, lead-lag events of the rotor blades 33 are transmitted to the piston 411 and then to the rotary inductive device 412 via the gear train 413 to cause the rotary inductive device 412 to generate electricity.

In accordance with embodiments and, as shown in FIG. 5, the piston 411 is linearly displaceable within a linearly stationary ball screw 414 that includes ball bearings 415 and is supported by roller bearings 416. Thus, as the piston 411 is linearly displaced, the ball screw 414 is forced to rotate about a longitudinal axis of the piston 411. With the ball screw 414 being engaged with the gear train 413, this ball screw rotation is transmitted to the gear train 413 and then to the rotary inductive device 412. While the ball screw rotation is more extensive than the linear displacement of the piston 411 (i.e., a small linear displacement of the piston 411 may result in multiple rotations of the ball screw), the gear train 413 may include gearing that provides for a further gearing up of the ball screw rotation. The rotational period ultimately transmitted to the rotary inductive device 413 may be substantially increased relative to a length of the linear displacement of the piston 411.

The rotary inductive device 413 includes a rotor 420, a stator 421 and stator windings 422. The rotor 420 is coupled to the gear train 413 and is rotatably supported within the stator 421. The rotor 420 may have magnetic elements provided on its outer surface. The stator windings 422 are electrically coupled to the controller element 50 and are wound around the stator 421 and the rotor 420. The stator windings 422 may be provided as insulated, inductive coils wound in a three-phase configuration about an axis of rotation of the rotor 420.

When the stator windings 422 are energized by the controller element 50 with current applied thereto in a first direction, an induced electrical current is generated in a stator field to in turn generate flux in an induced rotor field. This flux magnetically interacts with the magnetic materials provided on the rotor 420 and causes the rotor 420 to rotate about its axis of rotation. Such rotor 420 rotation is transmitted to the ball screw 414 via the gear train 413 to thereby drive a linear displacement of the piston 411. That is, during operation of the rotating frame 30, rotor blade forces affect the position of the piston 411 and the corresponding rotational position of the rotor 420. As the angular displacement between the stator field and the induced rotor field in the rotor 420 diverges, a magnetic force is realized that drives a linear force on the piston 411.

The angular displacement between the stator field and the induced rotor field is slip. The controller element 50 may be designed in such a manner as to control the slip of each EMA 41 so as to influence damping forces acting on the rotor blades 33. That is, in a forward (i.e., lead) direction to counteract a lag event of the corresponding rotor blade 33. Conversely, when the stator windings 422 are energized by the controller element 50 with current applied thereto in a second direction, the stator windings 422 generate magnetic flux that acts on the piston 411 to drive a linear movement of the piston 411 in a reverse (i.e., lag direction) to counteract a lead event of the corresponding rotor blade 33.

In an event that the rotary inductive device 413 of each EMA 41 is operated by the controller element 50 in the generator mode, the slip is actively controlled to maximize electrical current generated in the stator windings 422. That is, lead-lag events of the rotor blades 33 result in linear movements of the corresponding pistons 411. These movements are converted into rotations of the ball screw 414, which are transmitted to the rotor 420 of the rotary inductive device 412 via the gear train 413. The subsequent rotor 420 rotation induces magnetic flux and generates current in the corresponding stator windings 422. To the extent that this current exceeds the current applied to the stator windings 422 by the controller element 50, the generated current can be transmitted to the power control electronics and high power distribution elements 61 by way of the controller element 50.

From the power control electronics and high power distribution elements 61, the generated current can be applied to various components of the non-rotating frame 20 by way of the slip-ring assembly 16, to active electrical components of the rotor system in the rotating frame 30 (e.g., vibration dampers and the sensors 71) or to the hub-mounted energy storage element 62. In the latter case, the generated current can be used to recharge the energy storage element 62 for later use in transmitting power to the various components of the non-rotating frame 20 by way of the slip-ring assembly 16 or to powering the active electrical components of the rotor system in the rotating frame 30.

In the active damping-on-demand mode, electrical power supplied to the stator windings 422 is minimized to the minimum amount determined to be necessary to maintain stability of the rotor system. Removing current to the stator windings 422 serves to reduce and even eliminate electromechanical forces acting on the rotor 420 thus allowing for complete elimination of damping forces if so desired due to the nature of the inductive design of the EMAs 41. Such active damping allows a change in the amount of damping according to rotor speed and conditions.

As described above, the active rotor damping system is capable of improving safety and reducing pilot workload by automatically detecting and then canceling major in-plane forces at a main rotor hub that are the source of ground resonance phenomenon. Also, damping on demand is provided by having the actuator operating in close loop control. Since it is an electro-mechanical design, electrical current can be cutoff which will serve to decouple blade 1/rev motion from appreciable in-plane damping forces. This will significantly reduce the loads inputted into the main rotor hub and the main rotor blades to thereby increase component lives and/or allow subsequent weight reductions. In addition, the electro-mechanical actuator (EMA) design allows for the complete and total elimination of hydraulics within the rotating system thus removing a driver of direct maintenance costs. Still further, the active rotor damping system postures an aircraft for adoption of active rotor technology. That is, the EMA can be back-driven throughout a majority of the flight regimes where it will operate as an electrical generator. This provides a power generation source within the rotating frame, which is advantageous for other "active-rotor" technologies and eliminates issues associated with slip-ring failures.

All rotorcraft with articulated or semi-rigid rotor systems could adopt the active rotor damping system described above. In addition, the system is adaptable to wind turbines and automotive damping systems.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An aircraft, comprising:
    a non-rotating frame;
    an engine disposed in the non-rotating frame;
    a rotating frame, which is drivable by the engine to rotate relative to the non-rotating frame to generate lift and thrust, the rotating frame comprising a hub and rotor blades extending outwardly from the hub;
    an actuation system comprising electro-mechanical actuators (EMAs) respectively disposed in the rotating frame between the hub and the rotor blades, each EMA comprising a rotary inductive device;
    a piston supported by a ball screw;
    a gear train mechanically connecting the rotary inductive device and the ball screw, the gear train being operable to convert linear displacements of the piston responsive to rotor blade lead/lag into rotation of the rotary inductive device; and
    a controller that controls the rotary inductive device to operate, in a first, active damping-on-demand mode, as a motor which drives the gear train, and, in a second, power generation mode, as a generator which is back driven by lead/lag events of the rotor blades through the gear train.

2. The aircraft according to claim 1, wherein the non-rotating frame comprises a slip-ring assembly by which electrical power and signals are transmittable between the non-rotating and rotating frames.

3. The aircraft according to claim 1, wherein the controller adjusts the EMAs in the second mode to apply variable damping to affect the rotor blade lead-lag.

4. The aircraft according to claim 1, wherein the actuation system further comprises feedback by which the controller controls the rotary inductive device of each EMA in the first or second modes.

5. The aircraft according to claim 1, wherein each EMA further comprises a linear actuator.

6. The aircraft according to claim 1, wherein the rotary inductive device comprises stationary stator windings and a rotor.

7. The aircraft according to claim 6, wherein the stationary stator-windings comprise insulated, inductive coils wound in a three phase configuration about an axis of rotation of the rotor.

8. The aircraft according to claim 1, wherein each EMA comprises a gear-train to convert the linear displacement of the piston to rotation with a gear reduction.

9. A rotor system of an aircraft, which is drivable to rotate to thereby generate lift and thrust for the aircraft, the rotor system comprising:
    a hub;
    rotor blades extending outwardly from the hub;
    an actuation system comprising electro-mechanical actuators (EMAs) respectively disposed between the hub and each of the rotor blades, each EMA comprising a rotary inductive device;
    a piston supported by a ball screw;
    a gear train mechanically connecting the rotary inductive device and the ball screw, the gear train being operable to convert linear displacements of the piston responsive to rotor blade lead/lag into rotation of the rotary inductive device; and
    a controller that controls the rotary inductive device to operate, in a first, active damping-on-demand mode, as a motor which drives the gear train, and, in a second, power generation mode, as a generator which is back driven by lead/lag events of the rotor blades through the gear train.

10. The rotor system according to claim 9, wherein the controller adjusts the EMAs in the second mode to apply variable damping to affect the rotor blade lead-lag.

11. The rotor system according to claim 9, wherein the actuation system further comprises feedback by which the controller controls the rotary inductive device of each EMA in the first or second modes.

12. The rotor system according to claim 9, wherein each EMA further comprises a linear actuator.

13. The rotor system according to claim 9, wherein the rotary inductive device comprises stationary stator windings and a rotor.

14. The rotor system according to claim 13, wherein the stationary stator-windings comprise insulated, inductive coils wound in a three phase configuration about an axis of rotation of the rotor.

15. The rotor system according to claim 9, wherein each EMA comprises a gear-train to convert linear motion to rotation with gear reductions.

16. The aircraft according to claim 1, further comprising: an energy storage device operatively connected to the controller.

17. The rotor system according to claim 9, further comprising an energy storage device operatively connected to the controller.

\* \* \* \* \*